United States Patent
Bannoura et al.

(10) Patent No.: US 8,700,803 B2
(45) Date of Patent: Apr. 15, 2014

(54) WEB PAGE OPTIMIZATION

(75) Inventors: Daniel L. Bannoura, Frisco, TX (US); Andre Angel, Plano, TX (US)

(73) Assignee: Netcordant, Inc., Plano, TX (US)

( * ) Notice: Subject to any disclaimer, the term of this patent is extended or adjusted under 35 U.S.C. 154(b) by 1325 days.

(21) Appl. No.: 12/477,416

(22) Filed: Jun. 3, 2009

(65) Prior Publication Data

US 2010/0312821 A1    Dec. 9, 2010

(51) Int. Cl.
*G06F 15/16* (2006.01)
*G06F 9/44* (2006.01)

(52) U.S. Cl.
USPC ............................ 709/247; 709/246; 717/115

(58) Field of Classification Search
USPC ........................................................ 717/120
See application file for complete search history.

(56) References Cited

U.S. PATENT DOCUMENTS

| | | | | |
|---|---|---|---|---|
| 5,367,674 | A * | 11/1994 | Berk et al. | 708/203 |
| 6,249,844 | B1 * | 6/2001 | Schloss et al. | 711/122 |
| 6,523,063 | B1 * | 2/2003 | Miller et al. | 709/206 |
| 6,886,013 | B1 * | 4/2005 | Beranek | 715/234 |
| 6,990,653 | B1 * | 1/2006 | Burd et al. | 717/108 |
| 7,096,418 | B1 * | 8/2006 | Singhal et al. | 715/205 |
| 7,120,897 | B2 * | 10/2006 | Ebbo et al. | 717/108 |
| 7,251,780 | B2 * | 7/2007 | Cheng | 715/234 |
| 7,945,698 | B2 * | 5/2011 | Bannoura et al. | 709/247 |
| 2002/0174437 | A1 * | 11/2002 | Mano et al. | 725/95 |
| 2003/0093427 | A1 | 5/2003 | Hsu et al. | |
| 2003/0149793 | A1 * | 8/2003 | Bannoura et al. | 709/247 |
| 2004/0128614 | A1 | 7/2004 | Andrews et al. | |
| 2006/0111911 | A1 * | 5/2006 | Morford | 704/270.1 |
| 2007/0168465 | A1 | 7/2007 | Toppenberg et al. | |
| 2008/0208979 | A1 | 8/2008 | Vishwanath et al. | |
| 2009/0024982 | A1 * | 1/2009 | Diep et al. | 717/115 |

OTHER PUBLICATIONS

United States Patent and Trademark Office, ISA/US, Notification of Transmittal of the International Search Report and the Written Opinion of the International Searching Authority, or the Declaration, for PCT/US2010/36896, mailed Aug. 4, 2010, 8 pages.

* cited by examiner

*Primary Examiner* — Lewis A Bullock, Jr.
*Assistant Examiner* — Keith C Yuen
(74) *Attorney, Agent, or Firm* — Haynes and Boone, LLP

(57) ABSTRACT

A method of serving a web page includes separating an original web page into a server-side executable portion and a server-side static portion. The server-side static portion is replaced with an identifier, and then a client-side executable program is created that will replace the identifier with the server-side static portion. The client-side executable program may be compressed in such a way that the server-side executable portion is stored in its original format. In response to a client request, the web server executes the resulting program and transmits the output to the requesting client. At the client, the response is decompressed if necessary and the client-side executable program is executed to integrated the server-side static portion with the server-side execution result.

26 Claims, 18 Drawing Sheets

202

206 →

```
<html>
<head>
<!-- #include head="nav_header.html" -->
</head>

<body>
<h2>Static Text</h2>
<p>First paragraph of text.</p>
<h2>Server Script</h2>
<p><%
dim i
for i=1 to 12
   response.write("Month " & i & " is " MonthName(i) _
                  & "<br>")
next
%></p>
<h2>Client Script</h2>
<script type="text/javascript">
var dayNames = new Array("Sunday","Monday","Tuesday",
"Wednesday","Thursday","Friday","Saturday");
var j;
for (j=0; j <= 6; j++) {
   document.write("Day ", j, " is ", dayNames[j],
          "<br>");
}
</script>
</body>
</html>
```

302 

```
<html>
<head>
<style stype="text/css">
h1 {text-align:center; color:rgb(0,0,255)}
h2 {text-align:left; color:rgb(127,0,0)}
</style>
<h1>Example Page</h1>
</head>

<body>
<h2>Static Text</h2>
<p>First paragraph of text.</p>
<h2>Server Script</h2>
<p><%
dim i
for i=1 to 12
   response.write("Month " & i & " is " MonthName(i) _
                     & "<br>")
next
%></p>
<h2>Client Script</h2>
<script type="text/javascript">
var dayNames = new Array("Sunday","Monday","Tuesday",
"Wednesday","Thursday","Friday","Saturday");
var j;
for (j=0; j <= 6; j++) {
   document.write("Day ", j, " is ", dayNames[j],
         "<br>");
}
</script>
</body>
</html>
```

304 encompasses the style and h1 section.

Fig. 3

```
~~~|0001:01]<%
dim i
for i=1 to 12
   response.write("Month " & i & " is " MonthName(i) _
                  & "<br>")
next
%>~~~|0001:02]
```

```
<Codekko id=0001:01><html>
<head>
<style stype="text/css">
h1 {text-align:center; color:rgb(0,0,255)}
h2 {text-align:left; color:rgb(127,0,0)}
</style>
<h1>Example Page</h1>
</head>

<body>
<h2>Static Text</h2>
<p>First paragraph of text.</p>
<h2>Server Script</h2>
<p></Codekko>
```

```
<Codekko id=0001:02></p>
<h2>Client Script</h2>
<script type="text/javascript">
var dayNames = new Array("Sunday","Monday","Tuesday",
    "Wednesday","Thursday","Friday","Saturday");
var j;
for (j=0; j <= 6; j++) {
   document.write("Day " & j & " is " dayNames[j]
                  & "<br>");
</script>
</body>
</html></Codekko>
```

```
<javascript src="build.js">
<javascript>
        var dynamic = "~~~|0001:01]<%
dim i
for i=1 to 12
  response.write(\"Month \" & i & \" is \" MonthName(i) _
                    & \"<br>\")
next
%>~~~|0001:02]";

var static = "Ã□□□□□□□□□□□□kD$V…Àu¸ À□^Ã<D$Pj h
ÿ€ <ð…ötdhÐ Vÿ$€ …Àt6=€
t= uFVÿ0€ ÿ € ¸ À⊔^ÃVÿ0€ ÿ € ¸ À⊔^ÃWV<50€ ÿÖ<= € ÿ×<í
QÿÖÿ×_3À^Ã□ □D$ Ph j h@ h
€ÿ€ …Àt 3À□ Ã<„$ □L$□TQ<L$Rj j PQÇD$ € <T$ Rÿ€ <OE$
□DPQè> ƒ¸ □
Ã□□□□□□□□□□□□□ì □D$ Ph j h@ h €ÿ€ …Àt$□L$ j Qj h j j j h@
h €ÿ€ <\"$ V⊔DRPè#
<\"$ <D$ƒ□Lh Qjj RPÿ € <L$<ðQÿ€ <Æ^□Ä Ã□□□";

var page = buildPage( dynamic, static );
        document.write( page );
</javascript>
```

```
<javascript src="build.js">
<javascript>
        var dynamic = "~~~|0001:01]Month 1 is
January<br>Month 2 is February<br>Month 3 is
March<br>Month 4 is April<br>Month 5 is May<br>Month 6 is
June<br>Month 7 is July<br>Month 8 is August<br>Month 9
is September<br>Month 10 is October<br>Month 11 is
November<br>Month 12 is December<br>~~~|0001:02]";

var static = "Ã□□□□□□□□□□□<D$V…Àu¸ À□^Ã<D$Pj h
ÿ€ <ð…ötdhÐ Vÿ$€ …Àt6=€
t= uFVÿ0€ ÿ € ¸ À□^AVÿ0€ ÿ € ¸ À□^ÃWV<50€ ÿÖ<= € ÿ×<í
QÿÖÿ×_3À^Ã□ □D$ Ph j h@ h
€ÿ€ …Àt 3À□ Ã<„$ □L$□TQ<L$Rj j PQÇD$ € <T$ Rÿ€ <OE$
□DPQè> ƒ¸ □
Ã□□□□□□□□□□□□ì □D$ Ph j h@ h €ÿ€ …At$□L$ j Qj h j j j h@
h €ÿ€ <\"$ V□DRPè#
<\"$ <D$ƒ□Lh Qjj RPÿ € <L$<öQÿ€ <Æ^□Ä Ã□□□";

var page = buildPage( dynamic, static );
        document.write( page );
</javascript>
```

```
<html>
<head>
<style stype="text/css">
h1 {text-align:center; color:rgb(0,0,255)}
h2 {text-align:left; color:rgb(127,0,0)}
</style>
<h1>Example Page</h1></head>

<body>
<h2>Static Text</h2>
<p>First paragraph of text.</p>
<h2>Server Script</h2>
<p>Month 1 is January<br>Month 2 is February<br>Month
3 is March<br>Month 4 is April<br>Month 5 is
May<br>Month 6 is June<br>Month 7 is July<br>Month 8
is August<br>Month 9 is September<br>Month 10 is
October<br>Month 11 is November<br>Month 12 is
December<br></p>
<h2>Client Script</h2>
<script type="text/javascript">
var dayNames = new Array("Sunday","Monday","Tuesday",
"Wednesday","Thursday","Friday","Saturday");
var j;
for (j=0; j <= 6; j++) {
   document.write("Day ", j, " is ", dayNames[j],
         "<br>");
}
</script>
</body>
</html>
```

```
1202
    <javascript src="build2.js">
    <javascript>
            var dynamic = "~~~|0001:01]<%
1206    dim i
        for i=1 to 12
           response.write(\"Month \" & i & \" is \" MonthName(i) _
                            & \"<br>\")
        next
        %>~~~|0001:02]";//EKKO_END_DYN!
1204
            var static = "<Codekko id=0001:01><html>
    <head>
    <style stype=\"text/css\">
    h1 {text-align:center; color:rgb(0,0,255)}
    h2 {text-align:left; color:rgb(127,0,0)}
    </style>
    <h1>Example Page</h1>
    </head>

<body>
    <h2>Static Text</h2>
    <p>First paragraph of text.</p>
    <h2>Server Script</h2>
    <p></Codekko>

1208    <Codekko id=0001:02></p>
    <h2>Client Script</h2>
    <script type=\"text/javascript\">
    var dayNames = new Array(\"Sunday\",\"Monday\",\"Tuesday\",
         \"Wednesday\",\"Thursday\",\"Friday\",\"Saturday\");
    var j;
    for (j=0; j <= 6; j++) {
       document.write(\"Day \" & j & \" is \" dayNames[j]
                            & \"<br>\");
    </script>
    </body>
    </html></Codekko>";

var page = buildPage2( dynamic, static );
            document.write( page );
    </javascript>
```

Fig. 12

```
                  1308                                             1302
                      XX XXXX XX<javascript src="build2.js">
                      <javascript>
                              var dynamic = "~~~|0001:01]<%
                      dim i
          1304        for i=1 to 12
                        response.write(\"Month \" & i & \" is \" MonthName(i) _
                                        & \"<br>\")
                      next
          1310        %>~~~|0001:02]";
                      XXnnnnXX==================================X==============
                      ============================================X=========
                      ========XX====================X===X====================
          1306        ========================================================
                      ========================================================
                      ===X==========
```

Fig. 13

| Position | Character |
|----------|-----------|
| 12 | 0x00 |
| 34 | 0x00 |
| 76 | % |
| 129 | 0x00 |
| 179 | % |

```
                                                    1502
        1508                                       ↙
          |
        ┌─────────────────────────────────────────────────┐
        │ XX XXXX XX<javascript src="build2.js">          │
        │ <javascript>                                    │
        │         var dynamic = "~~~|0001:01]Month 1 is   │
   1504 │ January<br>Month 2 is February<br>Month 3 is March<br>Month │
        │ 4 is April<br>Month 5 is May<br>Month 6 is June<br>Month 7 │
        │ is July<br>Month 8 is August<br>Month 9 is      │
        │ September<br>Month 10 is October<br>Month 11 is │
        │ November<br>Month 12 is December<br>~~~|0001:02]";│
        │ XXnnnnXX=================================X============= │
        │ ================================================X======= │
   1506 │ ========XX=====================X===X==================== │
        │ ================================================ │
        │ ===X========== │
        └─────────────────────────────────────────────────┘

Fig. 15
```

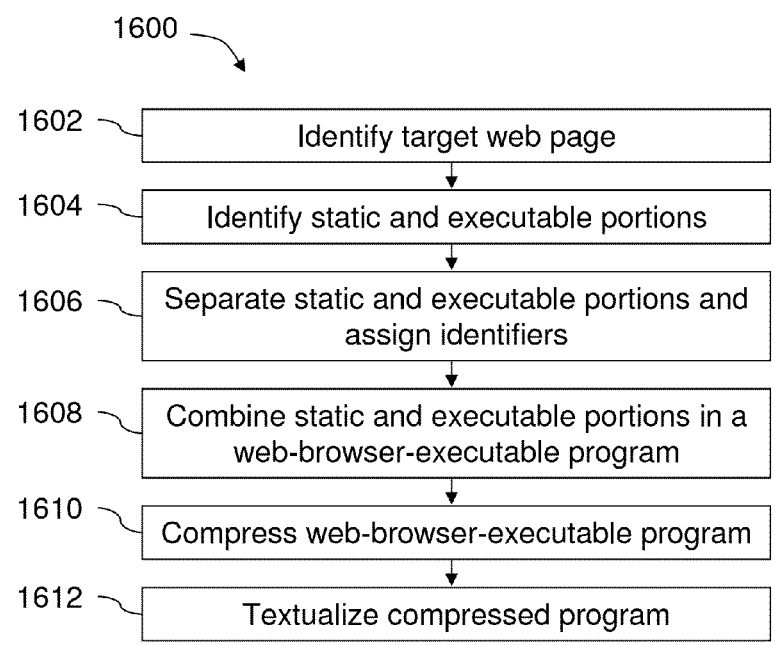

1904
```
<javascript src="build2.js">
<div id=dynamic style="visibility:hidden">~~~|0001:01]<%
dim i
for i=1 to 12
   response.write("Month " & i & " is " MonthName(i) _
                   & "<br>")
next
%>~~~|0001:02]</div>
```

1906
```
<div id=static style="visibility:hidden"><Codekko
id=0001:01><html>
<head>
<style stype="text/css">
h1 {text-align:center; color:rgb(0,0,255)}
h2 {text-align:left; color:rgb(127,0,0)}
</style>
<h1>Example Page</h1>
</head>

<body>
<h2>Static Text</h2>
<p>First paragraph of text.</p>
<h2>Server Script</h2>
<p></Codekko>

<Codekko id=0001:02></p>
<h2>Client Script</h2>
<script type="text/javascript">
var dayNames = new Array("Sunday","Monday","Tuesday",
     "Wednesday","Thursday","Friday","Saturday");
var j;
for (j=0; j <= 6; j++) {
   document.write("Day " & j & " is " dayNames[j]
                   & "<br>");
</script>
</body>
</html></Codekko></div>
```

1908
```
<javascript>
   var dyn = document.getElementById('dynamic').innerHTML;
   var stat = document.getElementById('static').innerHTML;
   var page = buildPage2( dyn, stat );
   document.write( page );
</javascript>
```

Fig. 19

WEB PAGE OPTIMIZATION

BACKGROUND

The World Wide Web provides a convenient platform for sharing information. Among the many services offered through web sites are banking, shopping, and e-mail. In order to provide better services, many companies now provide customized web pages to each visitor. The customizations include examples such as providing a weather report based on a visitor's location, selecting targeted advertisements, and providing access to a visitor's account with the web site. Because each web page sent to a visitor is customized, the web server hosting the web site must create each customized page on demand, as it is requested by a visitor. Thus, providing customized web pages can put a strain on the processing resources of the web server. The increasing popularity of web pages also increases the traffic load on network resources that send and receive web pages.

SUMMARY

In one embodiment, a method includes selecting an original source code, identifying a server-side executable portion of the original source code and a server-side static portion of the original source code, assigning an identifier to the server-side static portion of the original source code, combining the server-side executable portion of the original source code with the identifier to create an intermediate source code, wherein the identifier replaces the server-side static portion of the original source code, and creating a client-side executable program that includes the server-side static portion and the intermediate source and that when executed replaces the identifier in the intermediate source code with the server-side static portion of the original source code. In some embodiments, the client-side executable program may be encoded, such as by compression.

In another embodiment, a method for controlling a server computer includes receiving a request at the server computer, retrieving an optimized source code associated with the request, executing a portion of the optimized source code, replacing a character in the execution result, and providing the execution result with the replaced character in response to the request.

In yet another embodiment, a machine includes a web server computer coupled to receive a web page request over a network and in response to the request, to select an optimized version of the requested web page, to execute server-side executable code in the optimized version, and to provide an execution result to the requester with a response header that indicates that the execution result is in a compressed format.

In still another embodiment, a method includes selecting an original source code, identifying a server-side executable portion of the original source code and a server-side static portion of the original source code, assigning an identifier to the server-side executable portion of the original source code, combining the server-side static portion of the original source code with the identifier to create an intermediate source code, wherein the identifier replaces the server-side executable portion of the original source code, and creating a client-side executable program that includes the server-side executable portion and the intermediate source and that when executed replaces the identifier with the server-side executable portion of the original source code.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

FIGS. 2-7 illustrate an example document at various stages as it is processed.

FIGS. 12-13 and 15 illustrate an example document at various stages as it is processed to crate an optimized document.

FIG. 14 illustrates the locations of replaced characters stored in a memory.

FIG. 16 illustrates a process for preparing compressed web pages.

FIG. 19 illustrates a document that uses DIV tags to store the content of the static and server-side executable portions of a web page.

DETAILED DESCRIPTION

The present disclosure relates generally to the world wide web and a method of improving web pages. It is understood, however, that the following disclosure provides many different embodiments, or examples, for implementing different features of the invention. Specific examples of components and arrangements are described below to simplify the present disclosure. These are, of course, merely examples and are not intended to be limiting.

Figure 1:
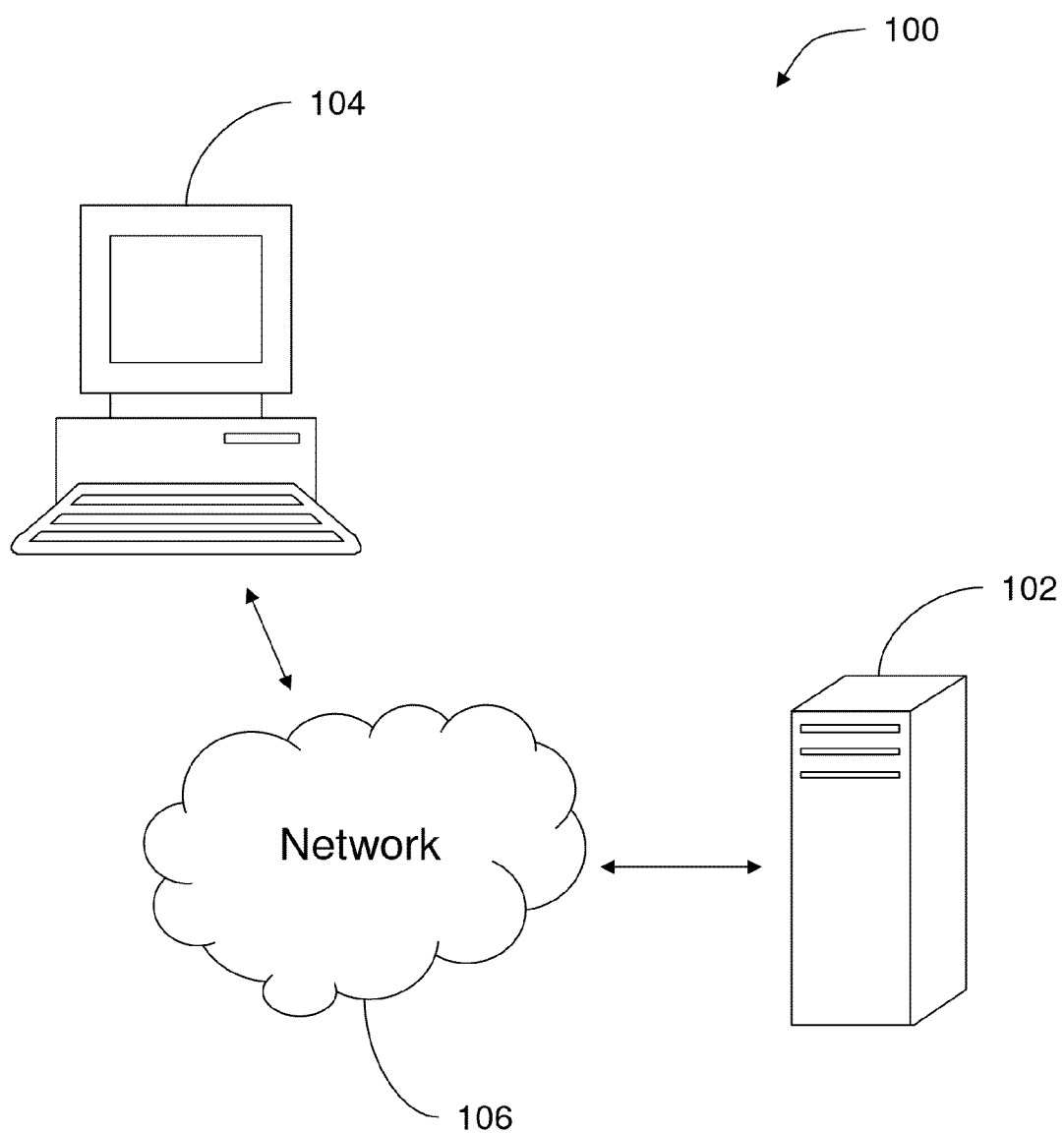
FIG. 1 illustrates a system for implementing web page optimization.

Referring to FIG. 1, illustrated is system 100 for implementing web page optimization technology. The system includes a server computer 102 that provides access to documents such as web pages. The server computer 102 may execute web server software that receives web page requests and responds to the requests by transmitting web pages. Example web server software includes Internet Information Server available from Microsoft and Apache available from the Apache Software Foundation. In responding to requests, the web server software selects a web page file that contains source code for producing the requested web page. The web server software executes portions of the source code and sends the execution result to a client computer 104.

The client computer 104 is coupled to the server computer 102 through a network 106. The client computer 104 executes web browser software that allows a user to access a web application, for example by requesting a web page from the server computer 102 and displaying the received web page to a user. The web browser software may also execute portions of the received web page. Examples of web browser software include Microsoft Internet Explorer, Apple Safari, Mozilla Firefox, and Google Chrome. The network 106 provides a communication pathway between the client computer 104 and the server computer 102.

The network 106 may include multiple wired or wireless connections, and zero or more additional computers may be present in the communication pathway between the client computer 104 and the server computer 102. The network 106 may include an electrical connection, an optical connection, a radio frequency connection, any other suitable communication connection, or a combination of multiple connections. The network 106 may include equipment such as switches, routers, hubs, multiplexers, demultiplexers, modulators, demodulators, and other suitable equipment. Alternately, the network 106 may be a virtual connection in the case of a loopback interface or virtualization software that allows the web browser software and the web server software to execute on the same computer hardware. The network 106 may also include additional clients and servers that are not illustrated. Examples of a network 106 include an internet such as the public Internet, an intranet such as a private corporate network.

In other embodiments, documents other than web pages may be requested and transmitted by the client 104 and server 102. For example, the documents may be XML documents.

The client 104 and server 102 may include one or more devices (not illustrated) for storing data to and retrieving data from a computer readable medium. The devices may be incorporated into the client 104 and/or server 102, or they may be attached either directly or indirectly, or they may be accessible over a network or data bus, or any combination of these. Example devices include registers, volatile memory such as random access memory, and nonvolatile memory such as a hard drive or optical drive. It is understood that storing data, which is generally binary in nature, to any of these computer readable media requires a transforming the state of a physical article. For example, storing a data bit to a register or to RAM generally involves charging or discharging a capacitor or setting the state of a flip-flop. Storing a data bit to magnetic media generally involves changing the magnetization of one or more grains within the magnetic medium. Storing a data bit to an optical disc generally involves scorching an organic dye or changing the phase of a metal alloy. Thus, storing a data bit to a computer readable medium involves updating a physical article so that it contains a representation of the stored data bit. Storing larger or more complex data is achieved by storing all of its constituent bits, whether sequentially or simultaneously or both. References to computer memory or other storage devices throughout are intended to cover any suitable computer readable medium.

FIGS. 2 through 7 illustrate an example document at various stages as it is processed. FIG. 2 shows an example document 202 that may be stored on the server computer 102. As illustrated, the example document 202 is a web page document, which contains instructions for one or more computers that when executed generate a visually displayable output that is physically perceptible to the unaided eye of a human. For example, the example document 202 includes instructions to be executed by web server and instructions to be executed by web browser client. The instructions determine both the content of the visual output and its organization, such as the position of displayable elements relative to each other, and relative to the boundaries of the visual output overall. The example document 202 includes a header section 203 and a body section 204. Header section 203 includes a server-side include statement 206 that directs a web server to incorporate the contents of another document when serving the example document 202.

FIG. 3 illustrates an example document 302 corresponding to the example document 202 after the first processing step. Specifically, the example document 302 includes content 304 that is inserted from the document referred to in server-side include statement 206. The content 304 replaces the server-side include statement 206.

FIG. 4 illustrates an example document 402 corresponding to the example document 302 after the next processing step. The portions of the document 302 that are server-side static have been replaced with identifiers 404 and 406. The identifiers have a structure that selected to be highly unlikely to occur in the original document. Identifiers 404 a value of "~~~|0001:01]", or three tilde characters followed by a pipe character, then a four-digit file identifier, a colon, and a two-digit static text identifier. The four-digit file identifier identifies a document, such as example document 202. The two-digit static text identifier identifies a portion of the document, such as the first section of static text before the first server-side executable portion. Identifier 406 has a similar structure, but has a different two-digit static text identifier since it identifies a different portion of the same document. Of course, the identifiers 404 and 406 are merely examples, and the identifiers may have a different structure, may be longer or shorter, and may be numeric, alphanumeric, binary, or any other suitable format.

FIG. 4 further illustrates that the portions of the document 302 that was replaced with identifiers 404 and 406 are now stored in a memory 408. The replaced portions have been placed inside of XML tags that include values from the related identifiers that were substituted from the content in document 402. Thus, the memory 408 contains a first portion 410 corresponding to the identifier 404 and a second portion 412 corresponding to the identifier 406.

The contents of memory 408 are then transformed to an alternate representation through a compression operation. Through this compression operation, the physical data encoded in memory 408 is transformed into a different physical data encoding, which may be stored in the same memory 408 or in a different memory. Thus the compression encoded data represents the original physical data that was in memory 408. Any suitable compression method may be used, such as ZIP, GZIP, compress, run length encoding, Huffman coding, Lempel-Ziv coding, open source ZLib library, or any other compression method. Some compression methods have a corresponding decompression method that is included with a variety of different web browsers. For example, many web browsers include a gzip decompression algorithm. Thus, when the gzip compression method is selected, the resulting file can be decompressed by many web browsers without a plug-in or any modification of or addition to the web browser. In some embodiments, an encoding technique other than compression may be used. For example, the content may be encrypted.

With many compression libraries, the resulting output is in a binary format and includes syntax characters (including character strings) that are considered illegal or that have special syntactic meaning in programs that will process the output in later steps. Thus, the compressed output may require some character substitutions. For example, null characters may be replace with a corresponding escape code, such as "\0". As another example, syntactic representations of newline characters, such as "\r" and "\n" may be replaced with escape sequences such as "\\r" and "\\n" that, when evaluated, produce the original literal text. Similar techniques can be applied to code delimiters such as "<%" and "%>" and "<!--#". Alternatively, the binary output may be made text-safe with binary-to-text encoding such as uuencode or MIME. As yet another alternative, the processing technique described below with respect to FIG. 19 may be used to obviate the need for some or all of the character substitutions.

FIG. 5 illustrates an example document 502 corresponding to the example document 402 after the next processing step. Document 502 is a JavaScript web page suitable for transmitting to a web browser in response to a page request. The content of document 402 is incorporated into a dynamic variable. The quotation marks in the document 402 are replaced with escape codes for the quotation mark. The compressed and text-safe representation of memory 408 is incorporated into a static variable. Document 502 also refers to an external JavaScript source file, build.js, that defines a function named buildPage( ). The buildPage( ) function accepts the static and dynamic variable as parameters and performs the necessary processing to decompress the static data and to replace the identifiers in the dynamic variable with the corresponding values from the decompressed static variable.

FIG. 6 illustrates an example document 602 corresponding to the example document 502 after server-side execution. Thus, FIG. 6 illustrates a document in a state as it would be transmitted from a web server to a requesting web browser. The server-side executable code that was in the dynamic variable has been replaced with the code's result. In this example, the code produced a list of the months in the year.

FIG. 7 illustrates an example document 702 corresponding to the example document 602 after execution of the buildPage( ) function. Thus, FIG. 7 illustrates a document as it would be stored in the page variable. The static and dynamic portions of the page have been recombined into their original organization as illustrated in FIGS. 2 and 3, but the server-side executable code has been executed and replaced with the execution results. Thus, example document 702 has the same content as the web server would have provided to the web browser if it had served document 302 in a convention manner.

Figure 8:
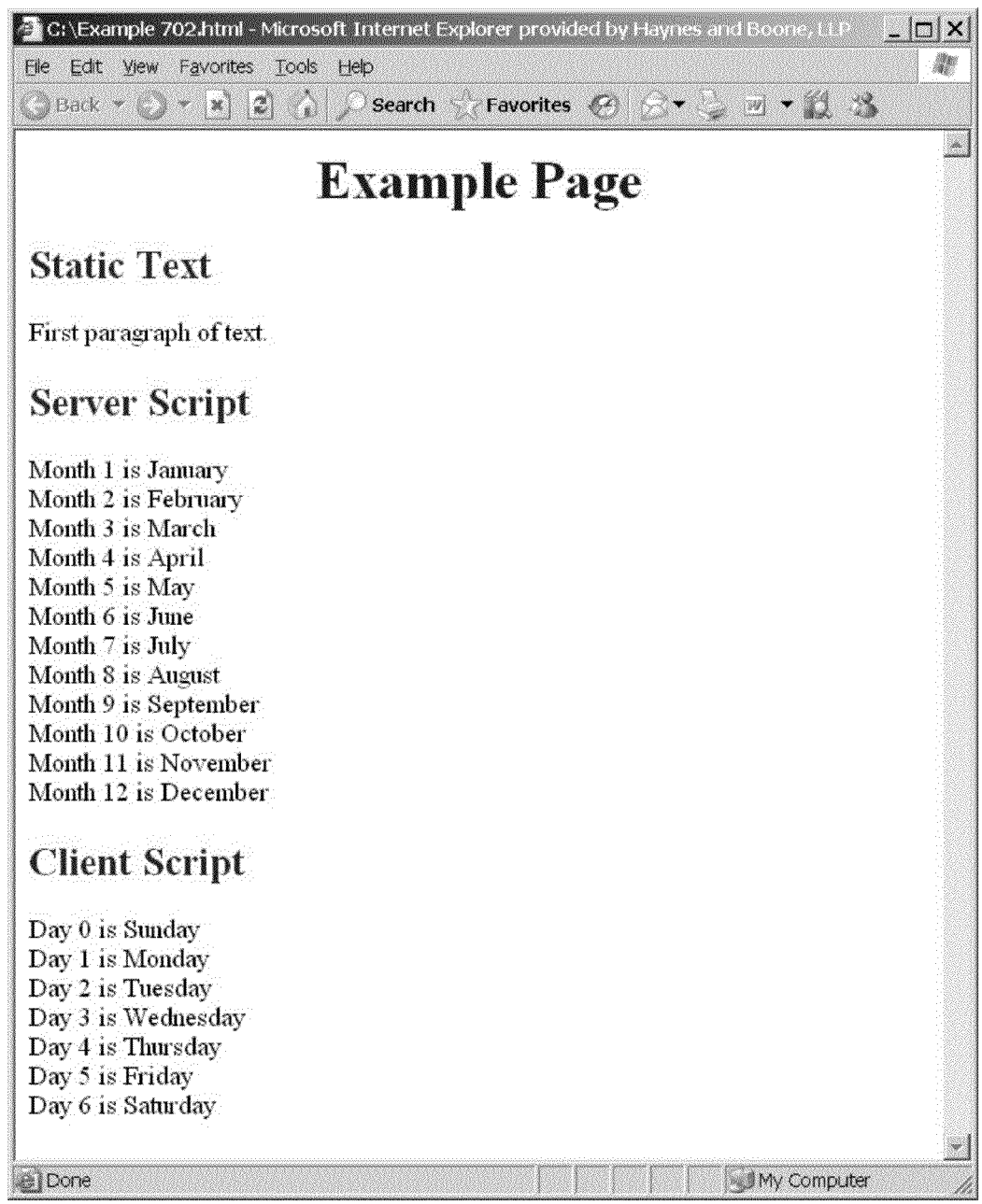
FIG. 8 illustrates a web browser window displaying the content produced by the example document illustrated in FIGS. 2 through 7.

FIG. 8 illustrates a web browser window 802 displaying the content produced by the example document 702.

Figure 9:
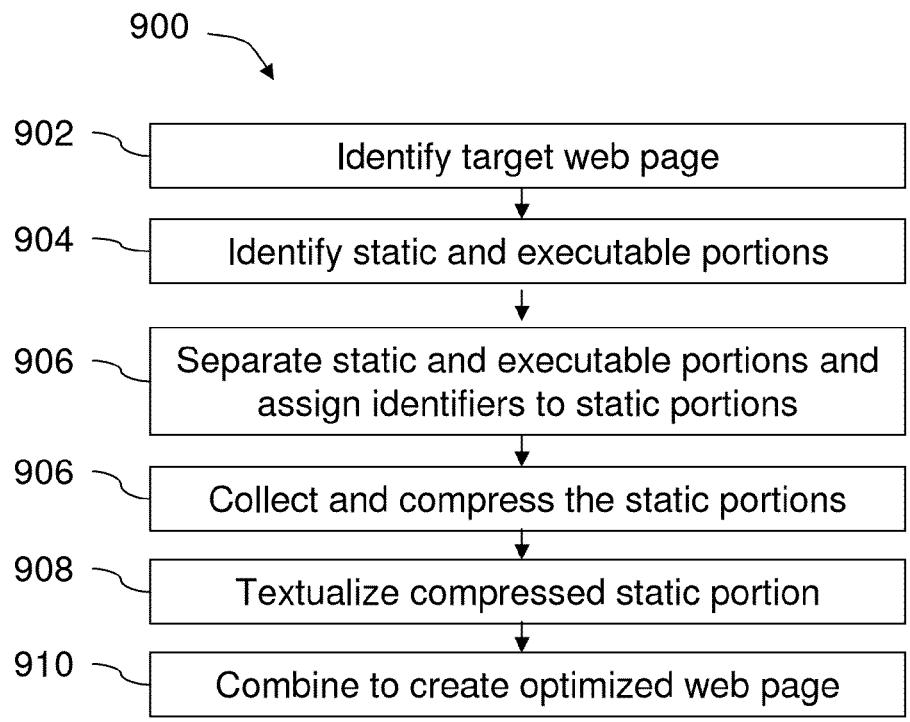
FIG. 9 illustrates a process for preparing compressed documents.

FIG. 9 illustrates a process 900 for preparing compressed documents. The process 900 begins in step 902 with identifying one or more target documents to be compressed. The documents may be web pages or other documents that include a mixture of static content and executable code. The documents may include various kinds of executable code, including code executable by a document server or by a document recipient or both. Then in step 904, the static portions and the executable portions of the document are identified. It is anticipated that in most cases the document will include both static and executable portions, and may have a many portions of each type, but it is possible that the document could include only one portion that is either static or executable.

Next in step 906, the static portions are separated from the executable portions of the web page. Identifiers are assigned to the static portions. The identifiers are preferably unique within the web page, and they may be unique across multiple web pages or across an entire web site. The identifiers are used to mark the location of the corresponding static portions relative to the executable portions. Alternatively, identifiers may be assigned to the executable portions and used to mark their location relative to the static portions.

Next in step 908, the static portions are collected together and compressed. The static portions may be tagged with their identifiers. Alternatively, the static portions may be concatenated together and their relative starting points stored along with their corresponding identifiers. The portion lengths may also be stored, although this information may not be necessary as the length can be computed from the starting locations of two successive portions. Any suitable compression method may be used, such as ZIP, GZIP, compress, run length encoding, Huffman coding, Lempel-Ziv coding, open source ZLib library, or any other compression method. In some embodiments, an encoding technique other than compression may be used. For example, the content may be encrypted.

Then in step 908, the compressed static portion is textualized by replacing characters that have a special meaning or that are not generally permitted in a text format with a corresponding escape code. For example, a null character (binary 0x00) is replaced with "\0", which is the escape code for a null character in Javascript. Thus, the resulting output is "text-safe." Another approach to textualizing the content is to use a text-encoding scheme, such as base64 encoding used in MIME and its derivatives as described in RFC 4648.

Continuing in step 910, the text-safe compressed static portions are re-combined with the executable portions from step 906 to create an optimized web page. The optimized web page may be a JavaScript web page that includes client-side executable code for decompressing the compressed static portions and reintegrating them with the server-side executable portions.

Figure 10:
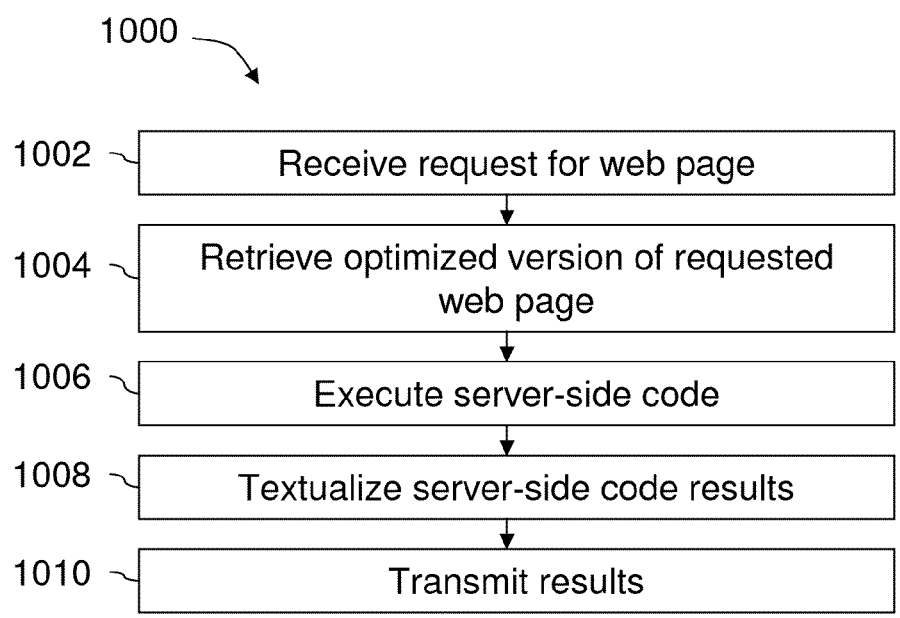
FIG. 10 illustrates a process for serving an optimized web page.

FIG. 10 illustrates a process 1000 for serving an optimized web page such as a web page produced by the process 900. The process 1000 may be employed by a web server, for example. The process 100 begins with step 1002 in which a request is received for a web page. Next in step 1004, an optimized version of the requested web page is retrieved. In step 1006, any server-executable portions of the web page are executed by the web server. Next in step 1008, the server-side result is textualized. The output produced by the server-side executable code is scanned for characters that would produce an error during client-side execution of the optimized web page, such as quotation marks. In the example illustrated previously in FIGS. 2-8, the server-side execution result is stored in a JavaScript variable, and a quotation mark produced by the server-side execution would be interpreted as ending the definition of that variable, causing an interpreter error. If the server-side code products a quotation mark, that character must be replaced with its corresponding escape string, a backslash preceding a quotation mark (\"). Textualizing these characters prevents errors in the web browser that will execute the optimized web page. Finally in step 1010, the resulting web page is transmitted to the requester.

Figure 11:
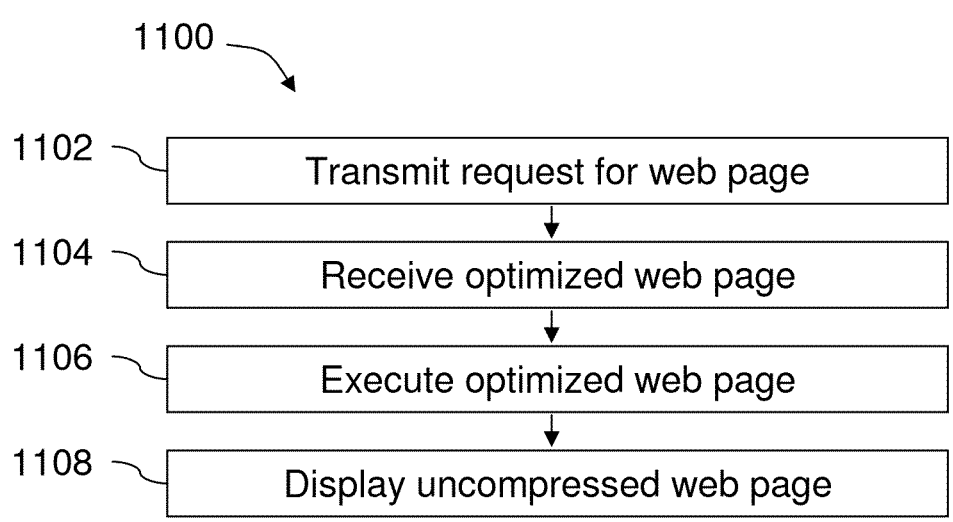
FIG. 11 illustrates a process for requesting and receiving optimized content from a web server.

FIG. 11 illustrates a process 1100 for requesting and receiving optimized content from a web server. The process 1100 is suitable for use in conjunction with the process 1000. The process 1100 begins in step 1102 with transmitting a request for a web page. The request may be an HTTP GET command. Next in step 1104, an optimized web page is received. In step 1106, the optimized web page is executed by the requester. As previously described, the optimized web page may be a JavaScript document, although any suitable programming language may be used. Executing the optimized web page on the client produces an uncompressed web page. Next, in step 1108, the uncompressed web page is displayed. If the uncompressed web page contains additional executable code, such as additional JavaScript code, that additional executable code may also be executed.

In another embodiment, a web page optimization system may exploit the gzip inflate routine that is built into many common web browsers, such as Microsoft Internet Explorer, Mozilla Firefox, Google Chrome, Apple Safari, and others. The gzip file format and compression standard are provided in RFC 1951 and 1952, which are hereby incorporated by reference. As explained in those documents, the gzip file format is comprised of a sequence of data blocks. Each data block can use a different encoding technique, including the deflate method and the store method. Thus, the optimization approach previously discussed in FIGS. 2-11 can be adapted so use the gzip decompression while still allowing for execution of server-side code within a compressed file.

The process for optimizing web pages using the gzip file format begins with the document 202 shown in FIG. 2. Initial processing is the same as previously described with respect to FIGS. 3 and 4. Subsequently, the file is processed to produce example document 1202 shown in FIG. 12. The example document 1202 contains JavaScript code defining a variable dynamic that contains the server-side executable portions from example document 402. A variable static contains the server-side static portions from memory 408. As previously describe, these variable definitions have been processed to add escape codes for some characters, such as quotation marks. The example document 1202 also refers to a JavaScript function buildPage2 that is defined in a separate JavaScript file, build2.js. The example document 1202 also includes a token 1204 with the value "\\EKKO_END_DYN!" to divide the document into two parts. A first part 1206 includes server-side executable portions and a second part 1208 includes only server-side static portions.

FIG. 13 illustrates a document 1302 corresponding to the document 1202 after a next step of processing. The document 1302 is in a gzip-compatible file format and includes a first block 1304 and a second block 1306. The first block 1304 includes a multibyte header 1308 that conforms to the gzip file format. Because the header 1308 may contain nonprintable characters, it is illustrated in FIG. 13 using the character "X." The header 1308 specifies that the first block is encoded using the gzip "store" encoding technique. Thus, the humanly-readable content that was in first part 1206 remains humanly readable in first block 1304. The token 1204 is used to determine the end of the first block 1304, and the token 1204 may be removed from the first block 1304 as it is no longer needed.

The second block 1306 includes a header 1310 that conforms to the gzip file format. The header 1310 specifies that the second block is encoded using the gzip "deflate" encoding technique. Thus, the content that was in the second part 1208 has been compressed and is no longer humanly readable in the second block 1306.

The document 1302 will be provided to the web server so that the server-side executable code in the first block 1304 can be executed. The document 1302 as described to this point may contain characters that would cause interpretation errors in the web server. For example, the headers 1308 and 1310 may include null characters (0x00) that the web server would mistakenly interpret as marking the end of the file. Similarly, the second block 1306 may include null characters. And the second block 1306 may include character strings that the server would interpret as marking the beginning of server-side executable content, such as "<%" or "<- -". To prevent these errors, the potentially error-inducing characters and character strings in document 1302 have been replaced with a capital X character. Of course, any other suitable replacement character could be used in place of the X character. So that these characters in the document 1302 can be restored after other processes occur, information about the replacements is stored.

As an alternative to the depiction in FIGS. 12 and 13, the contents of the first and second blocks could be swapped such that the first block contains the server-side static portion while the second block contains the server-side executable portion. Of course, it is understood that the document may include multiple blocks, and thus the server-side executable portion that remains uncompressed may be located in the first block, the last block, or an intermediate block.

FIG. 14 illustrates the locations of the replaced characters stored in a memory 1402. The memory 1402 is an array with entries recording the positions 1404 and values 1406 of characters that have been replaced. The positions 1404 may be measured from the beginning of the document 1302, from the end of the document 1302, or from any other suitable position. One advantage of measuring the positions from the end of the document 1302 is that if the length of the first block 1304 changes when the server-side executable code is later executed by the web server, the positions 1404 will not change relative to the end of the document 1302. If the positions 1404 are measured relative to the beginning of the document 1302, then they must be updated to account from any subsequent changes in the size or length of the first block 1304. The memory 1402 may not include any entries for characters that were replaced in the first block header 1308, since this header will have to be updated later when the server-side executable code is executed. Although the memory 1402 is illustrated as an array, any suitable memory structure may be used, such as a linked list, or a dynamic array. Alternatively, multiple memory structures could be used. For example, one memory structure may store the location of null characters while a second memory structure stores the location of another character such as a percent sign. Thus, it is possible that the character value may be stored implicitly rather than explicitly.

FIG. 15 illustrates a document 1502 corresponding to document 1302 after a next step of processing. Specifically, the document 1502 shows the result of a web server executing the server-side executable code in first block 1304 of document 1302. The document 1502 includes a first block 1504 in which the server-side executable code has been replaced with the execution results. In the illustrated example, the execution results are a list of the months in the year, but of course the server results may be any suitable output. The illustrated execution results do not include any characters that require escape codes. In other instances, the execution results may include characters that require escape codes, such as a quotation mark character. In these cases, the execution results are processed to replace the characters with their respect escape codes. For example, a quotation mark character (") may be replaced with a backslash followed by a quotation mark character (\"). After this process is complete, the length of the first block 1504 is determined so that the first block header 1508 can be updated with the correct block length. Finally, the syntax characters are inserted back into the document 1502 using the information previously stored in memory 1402. The resulting document can then be transmitted to a requesting web browser.

It is will be recognized that executing server-side code can provide an execution result that is smaller than, larger than, or the same size as the server-side code itself. Thus, the first block 1504 may be larger than the gzip file format allows for a single data block. Generally, the gzip file format supports individual data blocks of up to 64 kilobytes. To handle the situation where the server-side execution results are larger than can be stored in one gzip data block, the first block 1504 may be split into two or more gzip data blocks. The first block 1504 can be readily divided into multiple blocks by simply inserting one or more appropriate gzip block headers at the appropriate block boundaries. Thus, if the server-side execution results are 70 kilobytes in size, the first block 1504 is divided into two blocks with a first block of 64 kilobytes and a second block of 6 kilobytes. The second block will require a block header similar to the first block header 1508. Gzip block headers are 5 bytes in length, and thus splitting the first block 1504 into two blocks will add 5 bytes to the overall size of the document 1502. Because increasing the size of the document 1502 may, at a programmatic level, require allocating a new and larger memory space to hold the document 1502, in some embodiments the documents 1302 and 1502 may include one or more dummy block headers in between the first block 1504 and the second block 1506. A dummy block header specifies that its associated data length is zero. By including a dummy block header in the document 1302, the document 1502 will include the dummy block header needed to handle a situation where the first block 1504 is larger than can be stored in a single gzip block without requiring an increase in the size of the document 1502. If the dummy header block is not needed, it can either by left in the document 1502 or it can be deleted. If left in the document 1502, the dummy header block will not cause an error in the web browser or other program that decompresses the gzip file format because the dummy header block specifies that its associated block length is zero. Thus, the web browser or other program will process the header and read zero bytes before expecting the next header block, such as the header of block 1506.

It is worth noting that it is not a limitation on the disclosed process if the server-side executable code in the first block 1304 exceeds 64 kilobytes or any other size limitation imposed by the gzip file format. This is principally because the document 1302 does not have to be a fully properly formed gzip file since it will not be interpreted by a gzip file handler. Rather, the document 1302 is passed to a web server for execution of the server-side executable code. The web server does not attempt to interpret the gzip aspects of the file; it simply executes the server-side executable code. Thus, it does not matter whether the first block 1304 exceeds the allowable block size under the gzip file format. Only after the document 1302 is executed (and transformed into the document 1502) does the block size become a consideration.

FIG. 16 illustrates a process 1600 for preparing compressed web pages. The process 1600 begins in step 1602 with identifying one or more target web pages to be compressed. The web pages may include a mixture of static content and executable code, and the executable code may be of various types, including code executable by a web server and code executable by a web browser. Then in step 1604, the static portions and the server-side executable portions of the web page are identified. It is anticipated that in most cases the web page will include both static and server-side executable portions, and may have a many portions of each type, but it is possible that the web page could include only one portion that is either static or server-side executable.

Next in step 1606, the static portions are separated from the server-side executable portions of the web page. Identifiers are assigned to the static portions. The identifiers are preferably unique within the web page, and they may be unique across multiple web pages or across an entire web site. The identifiers are used to mark the location of the corresponding static portions relative to the server-side executable portions. Alternatively, identifiers may be assigned to the server-side executable portions and used to mark their location relative to the static portions.

Next in step 1608, the static portions and server-side executable portions are recombined using a template of a web-browser-executable program, such as a JavaScript template. The JavaScript template includes code executable by a web browser that when executed will cause the web browser to reintegrate the static portions and the server-side executable portions in the order and organization that they originally had in the target web page identified in step 1602. The JavaScript template also includes a token to mark the end of the portion that includes the server-side executable portions.

The template may alternatively be a non-JavaScript program. Examples of other kinds of templates include a VBScript program, a Flash program, a Java program, a Java Applet, an AJAX component, an AJAX program, a Microsoft SilverLight program, a Microsoft ActiveX program, a dynamic link library (DLL), and a cabinet (CAB) file.

Continuing the process 1600, in step 1610 the JavaScript program is compressed using a modified gzip encoding. The portions of the JavaScript program that include server-side executable code are encoded using the gzip STORE technique, and the other portions of the JavaScript program are encoded using the gzip DEFLATE technique. Then in step 1612, the compressed JavaScript program is textualized. The textualization process includes replacing null characters with a replacement character, such as the letter X. Textualization also includes replacing part or all of a marker used to indicate the beginning of server-side executable code, such as "<%". The location of the replaced characters is also stored so that the characters can be restored to their original value later. Depending on capabilities of the web server software, some or all of these textualization steps may be unnecessary. For example, it is unnecessary to textualize null characters if the web server software will process them without causing an error.

Figure 17:
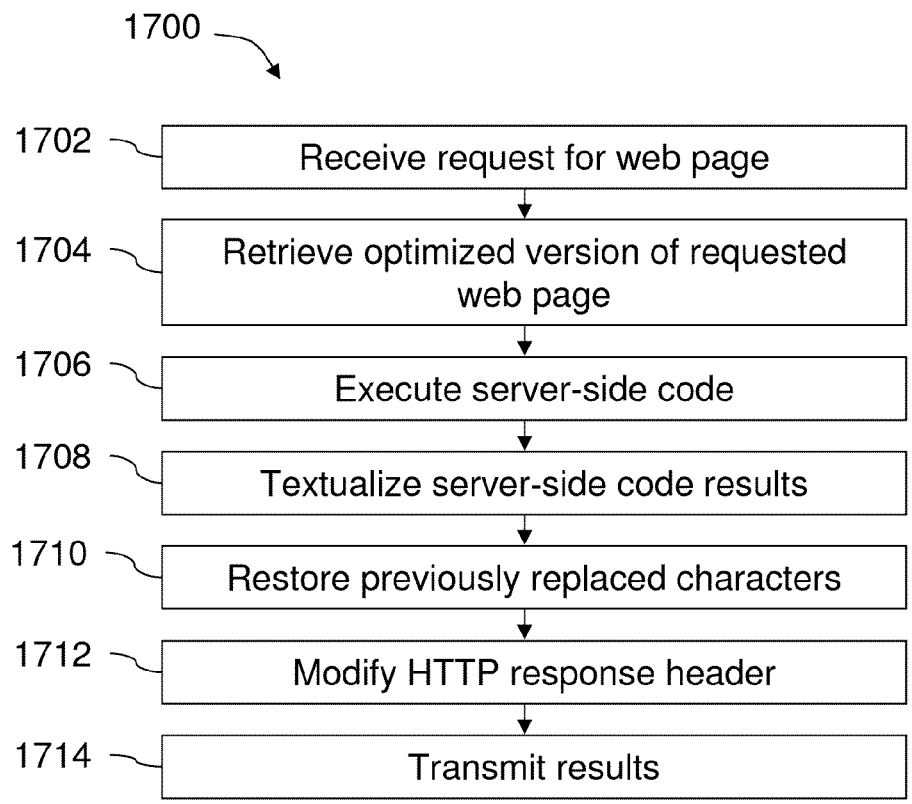
FIG. 17 illustrates a process for serving web pages that is suitable for use with web pages compressed.

FIG. 17 illustrates a process 1700 for serving web pages that is suitable for use with web pages compressed using the process 1600. The process 1700 may be employed by a web server, for example. The process 1700 begins with step 1702 in which a request is received for a web page. Examples of a request include an HTTP GET or POST message. Next in step 1704, an optimized version of the requested web page is retrieved. The optimized version is a version of a web page created using an optimization process such as the process 1600. The optimized version of the web page may be compared to an non-optimized version of the web page, for example, to determine whether the non-optimized version of the web page has been modified since the optimized version was created. If the non-optimized version has been updated, the optimized version may be updated such as by executing the steps of the process 1600.

In step 1706, the server-side executable code in the optimized web page is executed. This may be accomplished by providing the optimized web page to a web server execution engine. Executing the optimized web page causes the server-side executable code to be replaced by the execution results. Next in step 1708, the server-side result is textualized. The output produced by the server-side executable code is scanned for characters that would produce an error during client-side execution of the optimized web page, such as quotation marks. In the example illustrated previously in FIGS. 12-15, the server-side execution result is stored in a JavaScript variable, and a quotation mark produced by the server-side execution would be interpreted as ending the definition of that variable, causing an interpreter error. If the server-side code products a quotation mark, that character must be replaced with its corresponding escape string, a backslash preceding a quotation mark (\"). Textualizing these characters prevents errors in the web browser that will execute the optimized web page.

Then in step 1710, the characters previously replaced are stored. In short, this step involves undoing the effects of the textualization step 1612 in the process 1600. Thus, null characters and percent sign characters are restored to the locations that were saved to a memory such as memory 1400. In step 1712, the HTTP response header is modified to indicate that the response content is encoded using gzip. Finally in step 1714, the optimized web page is transmitted to the requester.

Figure 18:
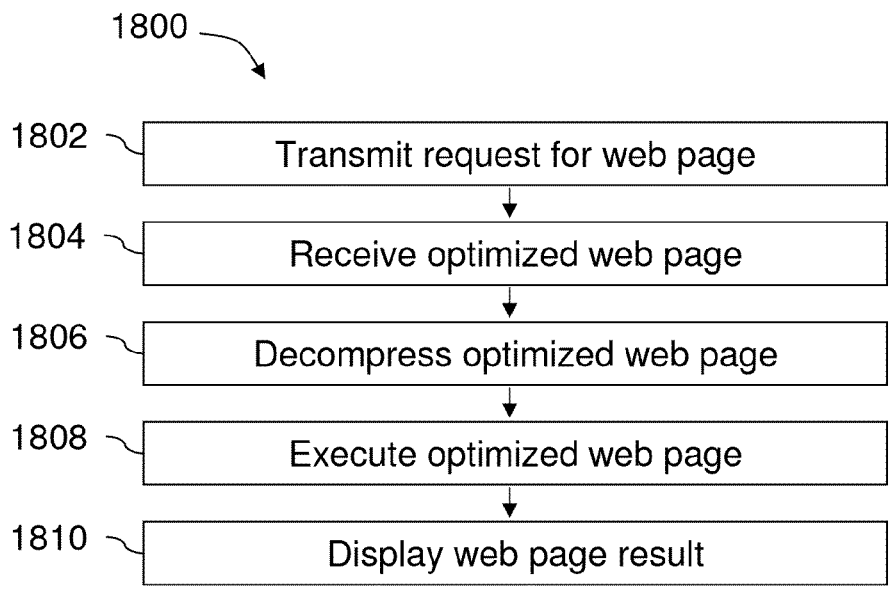
FIG. 18 illustrates a process for requesting and receiving content from a web server.

FIG. 18 illustrates a process 1800 for requesting and receiving content from a web server. The process 1800 is suitable for use in conjunction with the process 1700. The process 1800 begins in step 1802 with transmitting a request for a web page. The request may be an HTTP GET command, an HTTP POST command, or any other suitable request. Next in step 1804, an optimized web page is received. In step 1806, the optimized web page is decompressed, such as by using the gzip inflate method. Thus, the decompression step may exploit the decompression routines built into many web browser software programs, which generally execute more quickly than an interpreted decompression routine such as one written in JavaScript. Next in step 1808, the decompressed web page is executed. As previously described, the optimized web page may be a JavaScript document, although any suitable programming language may be used. Executing the optimized web page on the client produces an web page result. Finally in step 1810, the web page result is displayed. If the web page result contains additional executable code, such as additional JavaScript code, that additional executable code is also executed.

The techniques described above use a JavaScript program executed by a web browser to reconstruct, and in some instances to decompress, an optimized web page provided a web server. As described, the static and dynamic portions of an original web page are separated and placed into JavaScript variables, such as the variables static and dynamic described in FIGS. 5 and 12. Placing these web page portions in JavaScript variables requires that certain characters, such as quotation marks, be "escaped" in order to prevent interpreter errors when the JavaScript program is executed. This requirement adds to the processing necessary to prepare an optimized web page and increases the resulting file size, since the escape character sequences are longer than the characters they replace. As an alternative to placing the static and dynamic portions in JavaScript variables, they may be placed in an HTML DIV section. This variation is illustrated in FIG. 19.

FIG. 19 illustrates a document 1902 that uses DIV tags to store the content of the static and server-side executable portions of a web page. The document 1902 includes a first DIV section 1904 that provides the server-side executable portion. A second DIV section 1906 provides the server-side static portion. The JavaScript page building code in a third section 1908 loads two variables, dyn and stat, with the contents of the first and second DIV sections 1904 and 1906, respectively. Because the contents of the dyn and stat variables are loaded from the DIV sections, there is no need for characters such as quotation marks to be escape-coded within the DIV section. It is understood, of course, that the technique of FIG. 19 may not completely obviate the need to handle some syntax characters, such as the null character.

In general, a web browser receiving an optimized web page using the techniques described above will not be able to begin drawing or displaying the uncompressed, reconstructed web page for a user until the web browser has received the optimized web page in its entirety. For example, a web browser receiving the web page 602 will begin to build the web page 702 only after all, or nearly all of the web page 602 is received. Once the web browser builds the web page 702, it must then interpret the web page 702 in order to produce the final output for a user as shown in the web browser window 802. In order to allow a web browser to begin decompressing, reconstructing, and displaying an optimized web page before the entire optimized web page is received by the web browser, the optimized web page may be divided into two or more chunks that can be separately reconstructed. Thus, a web browser can begin reconstructing and displaying a first chunk while it continues to download a second chunk.

Verifying Optimization Results

It is generally preferred for the display of an web page delivered using the optimization techniques described above to be visually indistinguishable from the display of the corresponding original web page. In other words, it is preferred for the optimization process to not modify the web page as it is output from a web browser, whether on a display, through a printer, or otherwise. In order to ensure that the optimization process has not adversely affected a web page, testing may be used.

Figure 20:
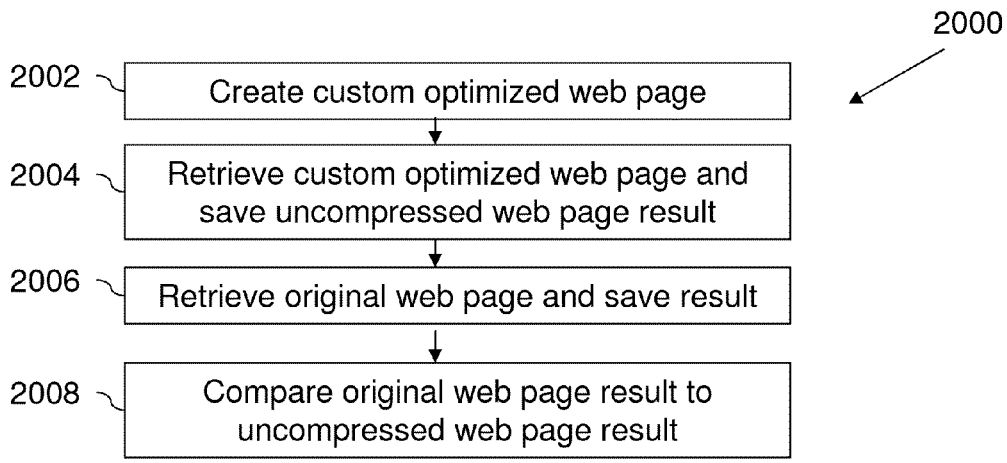
FIG. 20 illustrates a process for testing an optimized web page.

FIG. 20 illustrates a process 2000 for testing an optimized web page. The process 2000 begins in step 2002 with generating a custom version of an optimized web page. The custom version is created using a process similar to those described above, except that the JavaScript wrapper is modified slightly. In particular, the wrapper includes a statement to save the contents of the uncompressed web page as a file on a computer readable medium. This saving may be in addition to, or in place of, the command to display the uncompressed web page. For example, the JavaScript wrapper may supplement (or replace) the call to doc.write( ) with a call to file.write( ).

The process continues in step 2006 with retrieving the original web page. This step may be done by temporarily disabling the optimization process on the web server, or by requesting the web page from a web server that does not implement the optimization techniques described above. The resulting web page may be saved to a file, for example through the "Save As . . . " command available in many web browsers.

Next in step 2008, the original web page result is compared to the uncompressed web page result. If the comparison identifies a discrepancy between the two results, it may indicate that the optimized web page may provide a different display to an end-user. In other cases, the discrepancy may be irrelevant. For example, the discrepancy may involve whitespace, comments, or other non-functional aspects of the web page. The comparison process used in step 1508 may suppress reporting discrepancies that are recognized as being caused by certain kinds of non-functional content. If the comparison step 2008 does not identify any discrepancies between the original web page result and the uncompressed web page result, then either will produce the same web page display to an end user and the optimization process has been confirmed as not impacting the web page content.

Figure 21:
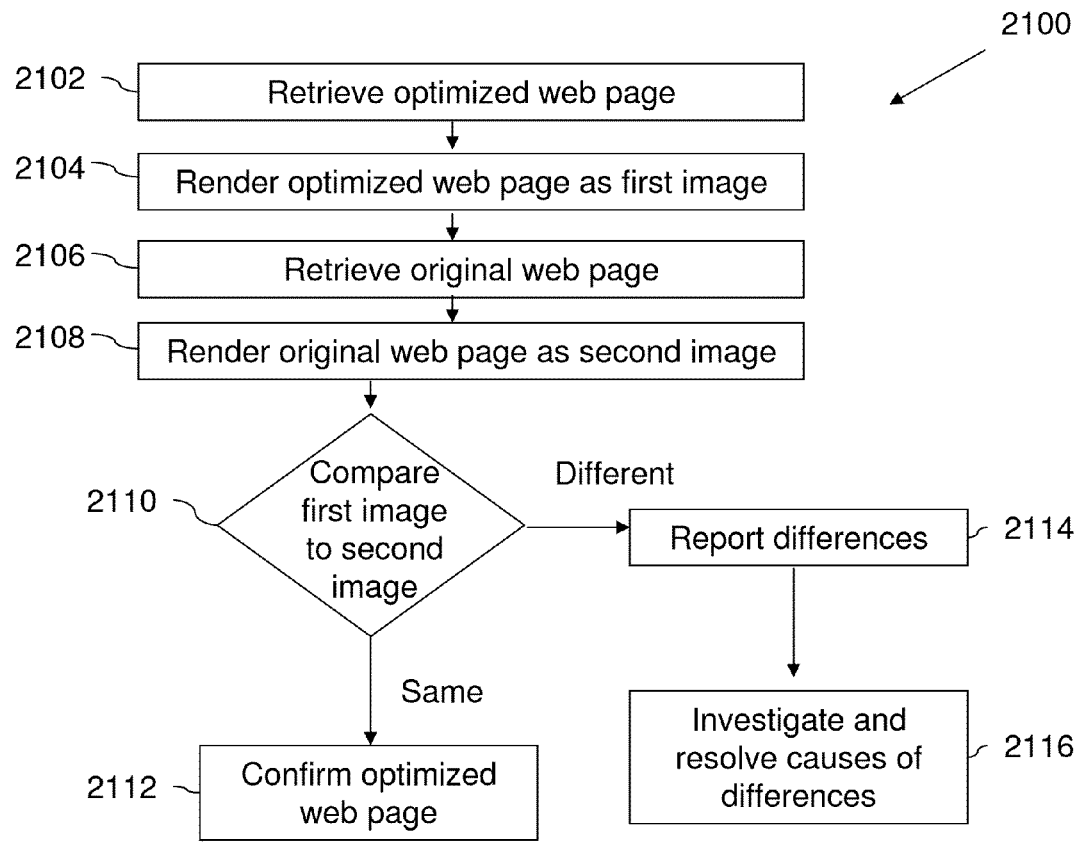
FIG. 21 illustrates another process for testing the optimization process.

FIG. 21 illustrates another process 2100 for testing the optimization process. The process 2100 begins with step 2102 where an optimized web page is retrieved. Next in step 2104 the optimized web page is rendered using a web browser rendering engine. The rendering engine's output is a first image that contains the content that a web browser would display to an end user. Then in step 2106 the original web page, corresponding to the optimized web page, is retrieved. And in step 2108, the web browser rendering engine renders the original web page as a second image. Next in step 2110, the first image is compared to the second image. This comparison may be a pixel-by-pixel comparison of the images. Thus, the comparison involves producing visual representations of the original and optimized web pages, which may be physically output. If the first image is identical to the second image, then the process continues to step 2112 where the optimization process is confirmed as not impacting the web page content. If the comparison identifies one or more discrepancies between the first and second images, then the process continues to step 2114 where the differences are reported. Alternately, the comparison step may report only those discrepancies that meet a certain threshold, such as a number of pixels or a percentage of the total image area. At step 2114, the differences detected by the comparison in step 2110 may be reported in any suitable manner. For example, the process may create a third image that highlights the location of detected differences, such as through the use of arrows, circles, or other techniques for drawing attention to the parts of the image where differences were detected. In the alternative or in addition, step 2114 may involve creating a text report identifying the location of detected differences. The process may then continue in step 2116 in which the cause or causes of the differences are investigated and resolved.

For web pages that have dynamic content, it may be desirable to repeat the process 1600 using different settings for the web page rendering engine. For example, a web page may incorporate content that adjusts dynamically based on the position of a mouse cursor (e.g., the web page has "mouseover" content.) The web page rendering engine will produce different output depending on the location of the mouse cursor. Thus, the process 2100 may be repeated for several different mouse cursor positions to ensure that the optimized web page result matches the original web page result, including its dynamic behavior based on mouse cursor position. The mouse cursor positions that are tested may be selected chosen at random, or they may be selected by a test operator to target certain parts of a web page. Alternately, the process 2100 may be executed for every possible mouse position.

Both of the comparison methods described in FIGS. 20 and 21 have distinct advantages. The image comparison method of FIG. 21 uses images of the rendered web page content, and thus it compares the optimized web page result to the original web page result in the form that either would be presented to the end user. Thus, the method of FIG. 21 more directly compares the visual result of a web page. On the other hand, the method of FIG. 20 compares the underlying code that is used to generate the web page. Thus, the method of FIG. 20 identifies the code which may cause a discrepancy in the visual output of a web browser. And because the method of FIG. 20 compares all of the underlying code, it can identify differences that may not initially be visually apparent. For example, the method of FIG. 20 may identify a difference that involves dynamic content that depends on more than simply the mouse cursor position.

As can be readily appreciated, the methods of both FIGS. 20 and 21 complement each other. For example, a visual difference may be detected by the method of FIG. 21. To help in identifying the underlying cause of the visual difference, the method of FIG. 20 may be used to highlight differences in the code for the part of the web page where the visual difference was detected.

Figure 22:
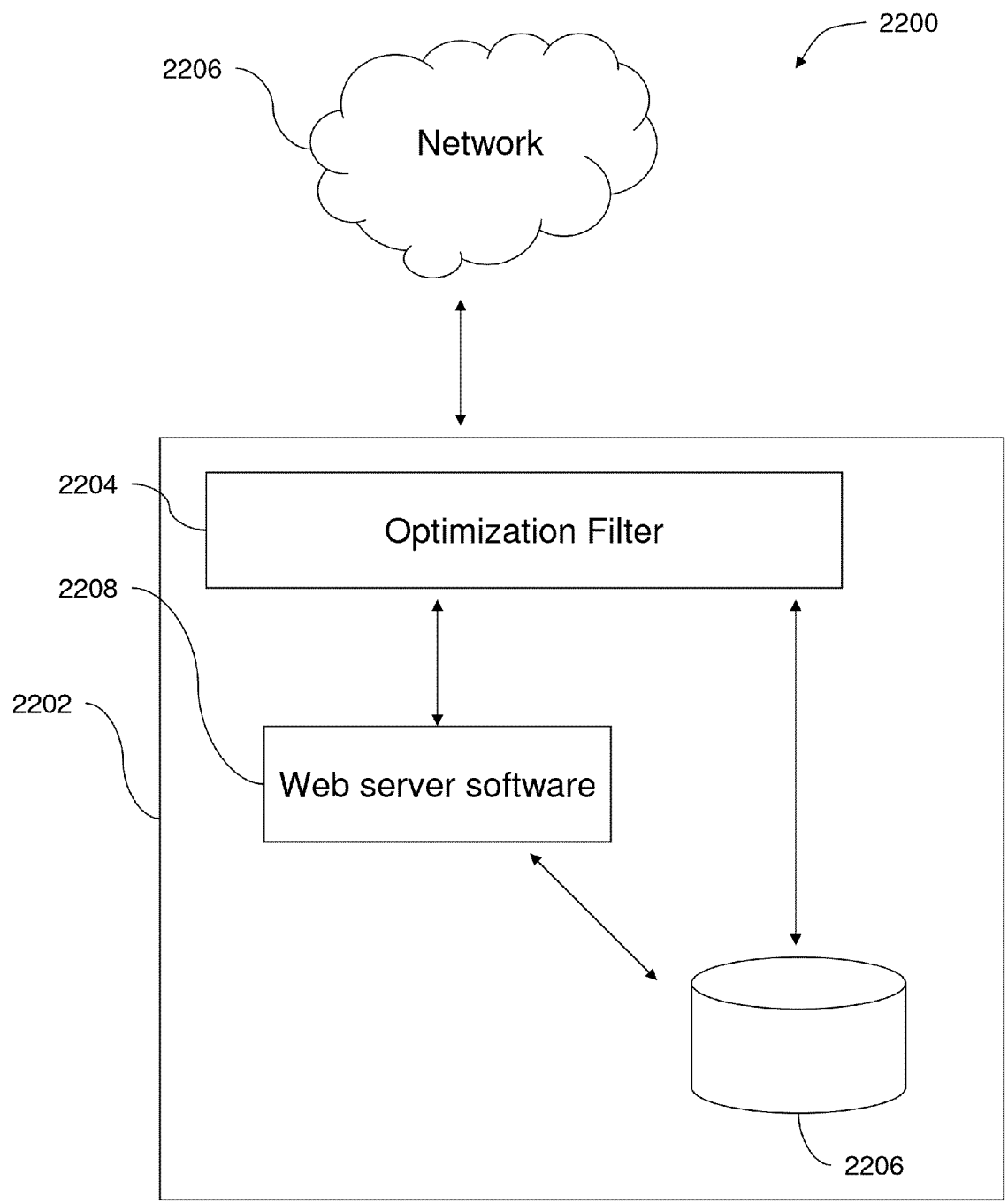
FIG. 22 illustrates a system for optimizing the serving capacity of a web server computer.
Figure 23:
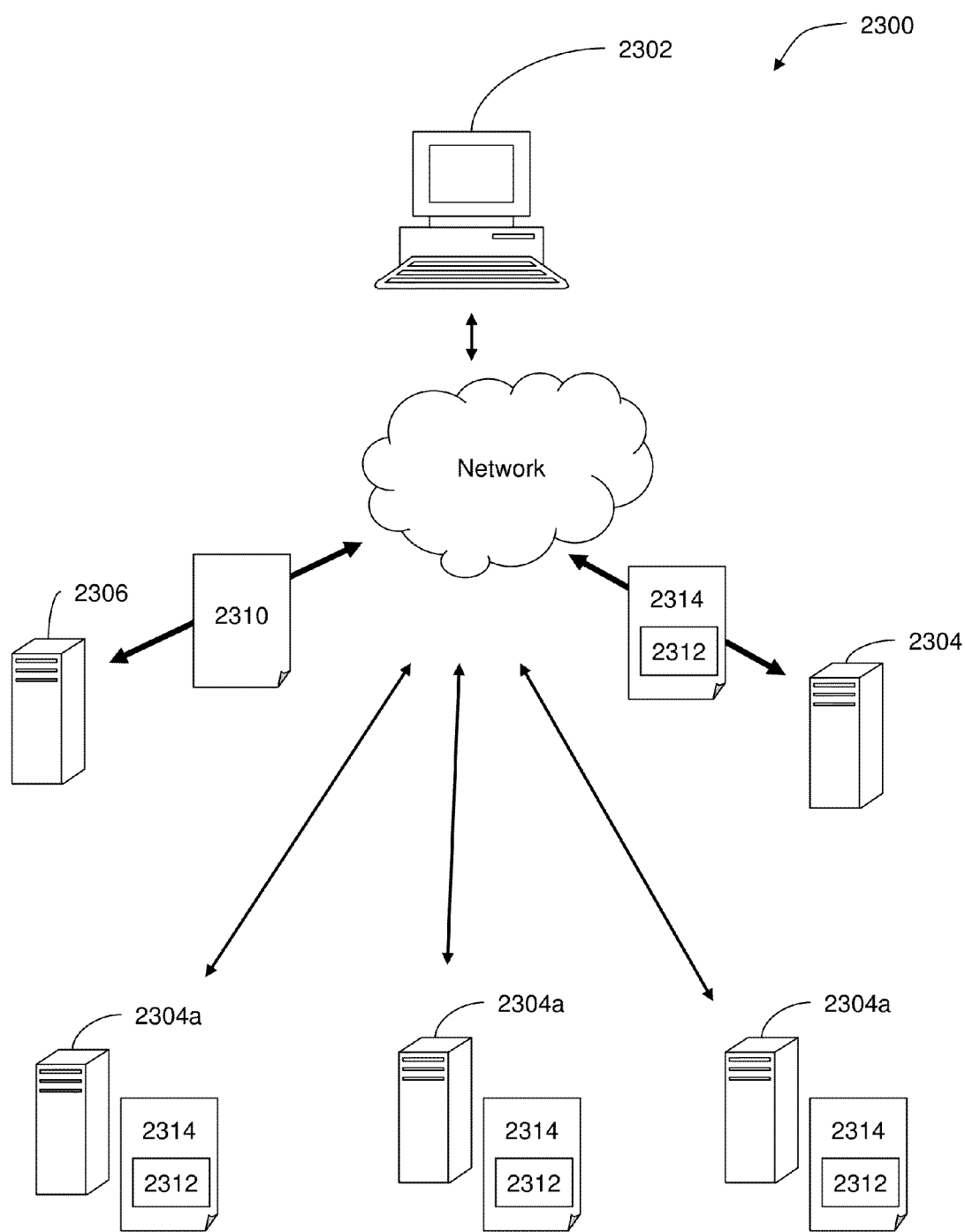
FIG. 23 illustrates another system for optimizing the serving capacity of a web server computer.

Turning now to FIG. 22, illustrated is a system 2200 for optimizing the serving capacity of a web server computer 2202. The system 2200 may be implemented using software, hardware, or a combination of both. A web server optimization filter 2204 receives web page requests from a network 2206. The network 2206 may be the public Internet, a private intranet such as a corporate or home network, or any other kind of network. The filter 2204 determines whether an optimized version of a requested web page exists. If an optimized version is available, the filter 2204 determines whether the original, non-optimized version of the web page has been updated since the optimized version was created. If necessary, the filter 2204 recreates the optimized version of the web page. As an alternative, the filter 2204 may process the received request using the non-optimized version of the web page and mark the optimized version as requiring recreation. The optimized version may then be recreated later, such as by a separately executing thread or process, thus preventing a delay in responding to the request.

The filter 2204 retrieves the up-to-date optimized version of the requested web page from a data storage 2206. The data storage 2206 may be one or more hard drives, volatile memory such as RAM, a storage array, a storage area network, or any other suitable data storage device or system. The data storage 2206 is illustrated as being part of the web server computer 2202, but the data storage 2206 may also be external to the computer and may be accessed via the network 2206 or another network or interface.

The filter 2204 then submits a request to a web server software 2208 to process the up-to-date optimized version of the requested web page. The web server software 2208 may be Internet Information Server available from Microsoft, Apache available from the Apache Software Foundation, or any other suitable web server software. The filter 2204 may provide the up-to-date optimized version of the requested web page to the web server software 2208, or it may submit a HTTP or other request to the web server software 2208 that specifies the up-to-date optimized version of the requested web page as a requested web page stored on the data storage 2206. The web server software 2208 retrieves the requested web page, if necessary, and executes any server-side executable code. Then the web server software 2208 provides the result to the filter 2204. The filter 2204 performs any post-server-side-execution processing that is needed, such as restoring syntax characters like null characters and percent signs. The filter 2204 also modifies the HTTP response header, if necessary, to indicate the encoding type of the optimized web page, such as gzip. Finally, the filter 2204 provides the result to the requester over the network 2206.

The filter 2204 may be implemented as a software component that integrates with the web server software 2208. For example, the filter may be a plug-in component for Microsoft IIS. In other embodiments, the filter 2204 may be a separate computer that is logically or physically placed between the web server software 2208 and the network 2206. Thus, the filter 2204 may be an stand-alone appliance-type device.

As shown in the system 2300, it is thus possible for two or more servers to provide portions of a web page source code to a client 2302. For example, the server-side static portion 2312 may be provided by a server 2304 as part of an intermediate client-side executable program 2314. A server-side executable portion 2310 is provided by a server 2306. Since the server-side static portion 2312 and the intermediate client-side executable program 2314 are static on the server side, the server 2304 does not need to access any user- or context-specific information to provide them in response to a request. Thus, they can be easily replicated across many servers 2304*a*, allowing that portion to be pre-positioned at a server near to a requester. This can be accomplish, for example, by using a content delivery network, such as Akamai.

The server 2304 (or one of the replica servers 2304a) receives a request and in response provides an intermediate client-side executable program 2314 that includes the server-side static portion 2312. The intermediate client-side executable program 2314 may be provided in a compressed format, such a gzip or zlib compression format. The intermediate client-side executable program 2314 includes a command to be executed by the receiving client 2302 that will initiate a second request directed to the server 2306 to receive the server-side executable portion 2310 of the requested web page. Preferably this command is located toward the beginning of the intermediate client-side executable program 2314 so that it may be executed by the client while the client continues to receive the latter portions of the program, including the server-side static portions. When the client 2302 receives the server-side executable portion 2310 from the server 2306, the server-side executable portion 2310 and the server-side static portion 2312 are merged, as previously described, and the resulting web page is presented to the user.

Of course, the system 2300 could be further modified such that the intermediate client-side executable program does not include the server-side static portion, but rather it includes a command to be executed by the client to retrieve the server-side static portion from one of the servers 2304 and 2304a.

Thus, the system 2300 illustrates a way to maximize the serving capacity of the server 2306, which is the only server that requires access to data specific to a request. For example, if a web page is for providing access to a customer's bank transactions, only the server 2306 requires access to the bank's financial records for the customer. Because the server 2306 is not tasked with providing parts of a web page that are the same for every user, the server 2306 can more efficiently respond to customer requests and can respond to more customer requests.

This disclosure is described in the context of requesting and serving web pages over a network. But those of skill in the art will recognize that the present disclosure may be used in other contexts. For example, the technology may be used within a single computer without the requirement of a network. As another example, the disclosed techniques may be applied to documents other than web pages, such as interpreted or compiled scripts or programs, XML documents, database records, or any other kind of document.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method implemented on a computer in communication with a computer-readable storage medium, the method comprising:
    selecting an original source code that includes instructions that when executed by one or more computers produce a visual output;
    identifying a server-side executable portion of the original source code and a server-side static portion of the original source code;
    assigning an identifier to the server-side static portion of the original source code;
    separating the server-side executable portion of the original source code from the server-side static portion of the original source code;
    combining the server-side executable portion of the original source code with the identifier to create an intermediate source code, wherein the identifier replaces the server-side static portion of the original source code;
    creating an optimized version of the source code comprising:
        a client-side executable program operable to replace the identifier in the intermediate source code with the server-side static portion of the original source code; and
        the intermediate source code and the server-side static portion of the original source code;
        wherein the server-side executable portion of the optimized version of the source code is encoded using a first technique and the other portions are encoded with a second technique, and wherein the first encoding comprises:
            determining a location of a syntax character in the optimized version of the source code;
            replacing the syntax character with an alternate character;
            storing a datum indicating the location of the replaced syntax character;
        wherein the optimized version of the source code when executed by one or more computers produces the visual output; and
    updating at least a portion of the computer readable medium to include a representation of the optimized version of the source code.

2. The method of claim 1 wherein the encoding stores the intermediate source code in its original format.

3. The method of claim 1 wherein the encoding step uses one selected from the group consisting of: gzip compression and zlib compression.

4. The method of claim 1 wherein the encoding stores the intermediate source code as a first data block.

5. The method of claim 1 wherein the encoding stores the intermediate source code as a last data block.

6. The method of claim 1 wherein the encoding stores the intermediate source code as a data block that is neither the first data block nor the last data block.

7. The method of claim 1 wherein the datum encodes a location relative to the end of the optimized version of the source code.

8. The method of claim 1 further comprising:
    replacing the alternate character with the syntax character after the optimized version of the source code has been executed.

9. The method of claim 1 further comprising:
    determining a location of a syntax character in the optimized version of the source code; and
    replacing the syntax character with a syntactically legal representation of the syntax character.

10. The method of claim 1 wherein the client-side executable program is one selected from the group consisting of: a JavaScript program, a VBScript program, a Flash program, a Java program, a Java Applet, an AJAX component, an AJAX program, a SilverLight program, an ActiveX program, a dynamic link library, and a cabinet file.

11. The method of claim 1 where in the creating step uses a program template.

12. The method of claim 1 wherein the original source code is a source code for part of a web application.

13. The method of claim 12 wherein the original source code is a source code for a web page.

14. The method of claim 12 wherein the identifier is unique across either the web application or across an entire website.

15. An apparatus comprising:
a computer-readable non-transitory storage medium containing instructions executable on a computer and that when executed cause the computer to:
select an original source code;
identify a server-side executable portion of the original source code and a server-side static portion of the original source code;
assign an identifier to the server-side static portion of the original source code;
separate the server-side executable portion of the original source code from the server-side static portion of the original source code;
combine the server-side executable portion of the original source code with the identifier to create an intermediate source code, wherein the identifier replaces the server-side static portion of the original source code; and
create an optimized version of the source code comprising:
a client-side executable program operable to replace the identifier in the intermediate source code with the server-side static portion of the original source code; and
the intermediate source code and the server-side static portion of the original source code;
wherein the server-side executable portion of the optimized version of the source code is encoded using a first technique and the other portions are encoded with a second technique, and wherein the first encoding comprises:
determining a location of a syntax character in the optimized version of the source code;
replacing the syntax character with an alternate character;
storing a datum indicating the location of the replaced syntax character;
wherein the optimized version of the source code when executed by one or more computers produces a visual output; and
update at least a portion of the computer readable medium to include a representation of the optimized version of the source code.

16. A method implemented on a computer in communication with a computer-readable storage medium, the method comprising:
selecting an original source code that includes instructions that when executed by one or more computers produce a visual output;
identifying a server-side executable portion of the original source code and a server-side static portion of the original source code;
assigning an identifier to the server-side executable portion of the original source code;
separating the server-side static portion of the original source code from the server-side executable portion of the original source code;
combining the server-side static portion of the original source code with the identifier to create an intermediate source code, wherein the identifier replaces the server-side executable portion of the original source code;
creating an optimized version of the source code comprising:
a client-side executable program operable to replace the identifier in the intermediate source code with the server-side executable portion of the original source code; and
the intermediate source code and the server-side executable portion of the original source code;
wherein the server-side executable portion of the optimized version of the source code is encoded using a first technique and the other portions are encoded with a second technique, and wherein the first encoding comprises:
determining a location of a syntax character in the optimized version of the source code;
replacing the syntax character with an alternate character;
storing a datum indicating the location of the replaced syntax character;
wherein the optimized version of the source code when executed by one or more computers produces the visual output; and
updating at least a portion of the computer readable medium to include a representation of the optimized version of the source code.

17. A method of controlling a server computer in communication with a computer-readable storage medium, the method comprising:
receiving a request at a server computer;
determining a source code corresponding to the request;
retrieving an optimized version of the source code from the computer readable storage medium, wherein the optimized version of the source code comprises an uncompressed server-side executable portion, a compressed server-side static portion, and a client-side executable program operable to replace identifiers with uncompressed server-side static portions;
executing by the server computer the server-side executable portion of the optimized version of the source code to generate a server-side execution result;
retrieving a location of a replaced character in the server-side execution result;
replacing a first character in the server-side execution result at the location with a second character; and
providing an optimized server-side execution result with the second character at the location in response to the request, wherein the optimized server-side execution result further comprises the compressed server-side static portion and the client-side executable program.

18. The method of claim 17 further comprising:
modifying a response header to indicate that a content of the response is compressed.

19. The method of claim 18 wherein the modifying comprises indicating that the content is one selected from the group consisting of: gzip encoded and zlib encoded.

20. The method of claim 18 wherein the modifying comprises updating a block header for a block of data to indicate the length of the block.

21. A machine comprising:
a web server computer communicatively coupled to a network and operable to:
receive a request for a web page from a requester;
in response to receiving the request, select an optimized version of the requested web page, wherein the optimized version of the requested web page comprises an uncompressed server-side executable portion, a compressed server-side static portion, and a client-side executable program operable to replace identifiers with uncompressed server-side static portions;

execute the server-side executable portion in the optimized version of the requested web page to generate a server-side execution result;

retrieve a location of a replaced character in the server-side execution result;

replace a first character in the server-side execution result at the location with a second character; and provide an optimized server-side execution result with the second character at the location to the requester, wherein the optimized server-side execution result comprises the compressed server-side static portion and the client-side executable program.

22. The machine of claim 21 wherein the optimized version comprises blocks of data encoded in one selected from the group consisting of: a gzip compression format and a zlib compression format.

23. The machine of claim 21 wherein the web server computer provides a customized response to the requester in a compressed format without compressing any data in the customized response.

24. The machine of claim 21 wherein the web server computer provides a customized response to the requester in a compressed format without compressing any data after receiving the request.

25. The machine of claim 21 wherein the response header is an HTTP response header and wherein the web server computer modifies the HTTP response header so that the HTTP response header indicates that the execution result is in a compressed format.

26. The machine of claim 21 wherein the web server computer modifies the execution result before providing the execution result to the requester by replacing a character in the result with a null character.

* * * * *